United States Patent [19]

Ito

[11] Patent Number: 5,014,895
[45] Date of Patent: May 14, 1991

[54] BUTTON APPLICATOR WITH SAFETY APPARATUS

[75] Inventor: Kazuyoshi Ito, Toyama, Japan

[73] Assignee: Yoshida Kogyo K. K., Tokyo, Japan

[21] Appl. No.: 503,671

[22] Filed: Apr. 3, 1990

[30] Foreign Application Priority Data

Apr. 4, 1989 [JP] Japan ............................... 1-39673[U]

[51] Int. Cl.$^5$ .......................... B21J 15/10; B21J 15/28
[52] U.S. Cl. .......................................... 227/8; 227/15; 227/31
[58] Field of Search ........................ 227/8, 15, 31, 154

[56] References Cited

U.S. PATENT DOCUMENTS

| 4,343,423 | 8/1982 | Sauermilch | 227/8 X |
| 4,378,900 | 4/1983 | Sauermilch | 227/8 |
| 4,703,882 | 11/1987 | Herten | 227/8 |
| 4,819,852 | 4/1989 | Toyota | 227/8 |

FOREIGN PATENT DOCUMENTS 2009020 6/1979 United Kingdom ................... 227/8

*Primary Examiner*—Timothy V. Eley
*Attorney, Agent, or Firm*—Hill, Van Santen, Steadman & Simpson

[57] ABSTRACT

A button applicator with a one-rotation clutch linked to a foot pedal and is released by a disconnecting and connecting mechanism. A safety member is provided between a punch and a die and urged upward. A swing lever is linked to the safety member at its one end and linked to an operation rod connected to the foot pedal at its substantial center and swings about another end of the swing lever. A means for shutting off the clutch is provided between the operation rod and the swing lever. A means for allowing the rotation of the clutch is provided between the operation rod and the connecting and disconnecting mechanism. According to a preferred embodiment, the means for allowing the rotation of said clutch comprises an intermediate rod linked to the connecting and disconnecting member and having a stopper at its end and an interconnecting member interconnecting the two rods, and the means for shutting off the clutch comprises a sliding bearing fixed to the swing lever, a collar mounted on the sliding bearing and a spring between the sliding bearing and a rod end. The relational movements of above mentioned two means release the clutch to rotate through the connecting and disconnecting mechanism. Finally, the punch linked to the clutch is brought down for caulking button elements when the operation rod is brought down to a deeper position by a predetermined interval than a predetermined position of the safety member being brought down.

11 Claims, 3 Drawing Sheets

BUTTON APPLICATOR WITH SAFETY APPARATUS

BACKGROUND OF THE INVENTION

1. Field of the Invention

This invention relates to an improved button applicator having a one-rotation clutch which is linked to a foot pedal for caulking upper and lower button elements through a fabric piece, more particularly to a button applicator of this kind with a safety apparatus.

2. Description of the Prior Art

In case of a button applicator with a one-rotation clutch, a foot pedal is applied to release a clutch and bring down a punch for caulking button elements for the purpose of holding and straining a fabric piece by hands of an operator. However, it is attended with danger in case that fingers of the operator happen to stay between a punch and a die.

A button applicator which can be operated in safety is disclosed in Japanese Laid Open Utility Model Publication No. 56-143218. This button applicator has a manual safety lever. According to this prior art, even if a foot pedal is stepped, a stopper maintains to engage with a claw of a clutch and a punch is not brought down as long as the manual safety lever is not operated. More detailed explanation of this prior art is as follows; First, the manual safety lever is operated to engage an actuating lever to the stopper. When the foot pedal is stepped, the stopper is pivoted by the actuating lever and releases the claw of the clutch. And finally, the clutch rotates to bring down the punch for caulking upper and lower button elements through a fabric piece.

According to this prior art, unless the manual safety lever is not operated, fail-safe is assured. However, after the manual safety lever is operated, the punch is brought down as soon as the foot pedal is stepped to release the clutch. Although the safety can not be secured, the fabric piece must be held to be strained by hands of an opertor for exact positioning of the button elements. Therefore, in case that fingers of the operator happen to stay between the punch and a die, this work carries a lot of danger for the operator.

SUMMARY OF THE INVENTION

According to this invention, a button applicator for caulking one button element to another button element through a fabric piece has a composition as follows;

A safety member urged upward is provided between a punch and a die. One button element is gripped by the punch and another button element is placed on the die. A swing lever, whose one end is linked to the safety member and whose substantial center is linked an operation rod connected to a foot pedal, swings about another end of the swing lever. A means for allowing rotation of a one-rotation clutch is provided between the operation rod and a connecting and disconnecting mechanism and is designed to release the one-rotation clutch from the connecting and disconnecting mechanism for rotation of the clutch.

Further, the button applicator of the present invention is characterized by following things;

A means for shutting off the clutch provided between the operation rod and the swing lever urges upward the operation rod with a predetermined interval. The means for allowing the rotation of the clutch is designed to rotate the clutch when the operation rod is brought down to a deeper position by the predetermined interval than a predetermined position of the safety member being brought down.

When the foot pedal is stepped, the operation rod is brought down, thus, the swing lever is pivoted by the means for shutting off the clutch to bring down the safety member to a predetermined point. Then, when the foot pedal is further stepped, the operation rod is brought down with the predeteremined interval provided on the means for shutting off the clutch. In this case, the relational movements of above mentioned two means facilitates the clutch to disengage from the connecting and disconnecting mechanism and begin one rotation. As a result, the punch is brought down for caulking the button elements.

However, in case that fingers of an operator happen to stay between the safety member and the die, a length that the operation rod can be brought down is shorter than a length to the predetermined point by a thickness of the fingers. Therefore, the above mentioned two means can not facilitate the clutch to disengage from the connecting and disconnecting mechanism, thus, the one-rotation clutch can not rotate. As a result, the punch is not brought down to secure safety for the operator.

It is an object of the present invention to provide a button applicator with a safety apparatus to secure safety in its operation due to provision of a safety member between a punch and a die which does not actuate a one-rotation clutch in case that fingers happen to stay between the safety member and the die.

Further objects and advantages of the present invention will be apparent from the following description, reference being had to the accompanying drawing wherein preferred embodiments of the present invention are clearly shown.

DESCRIPTION OF THE PREFERRED EMBODIMENT

Figure 1:
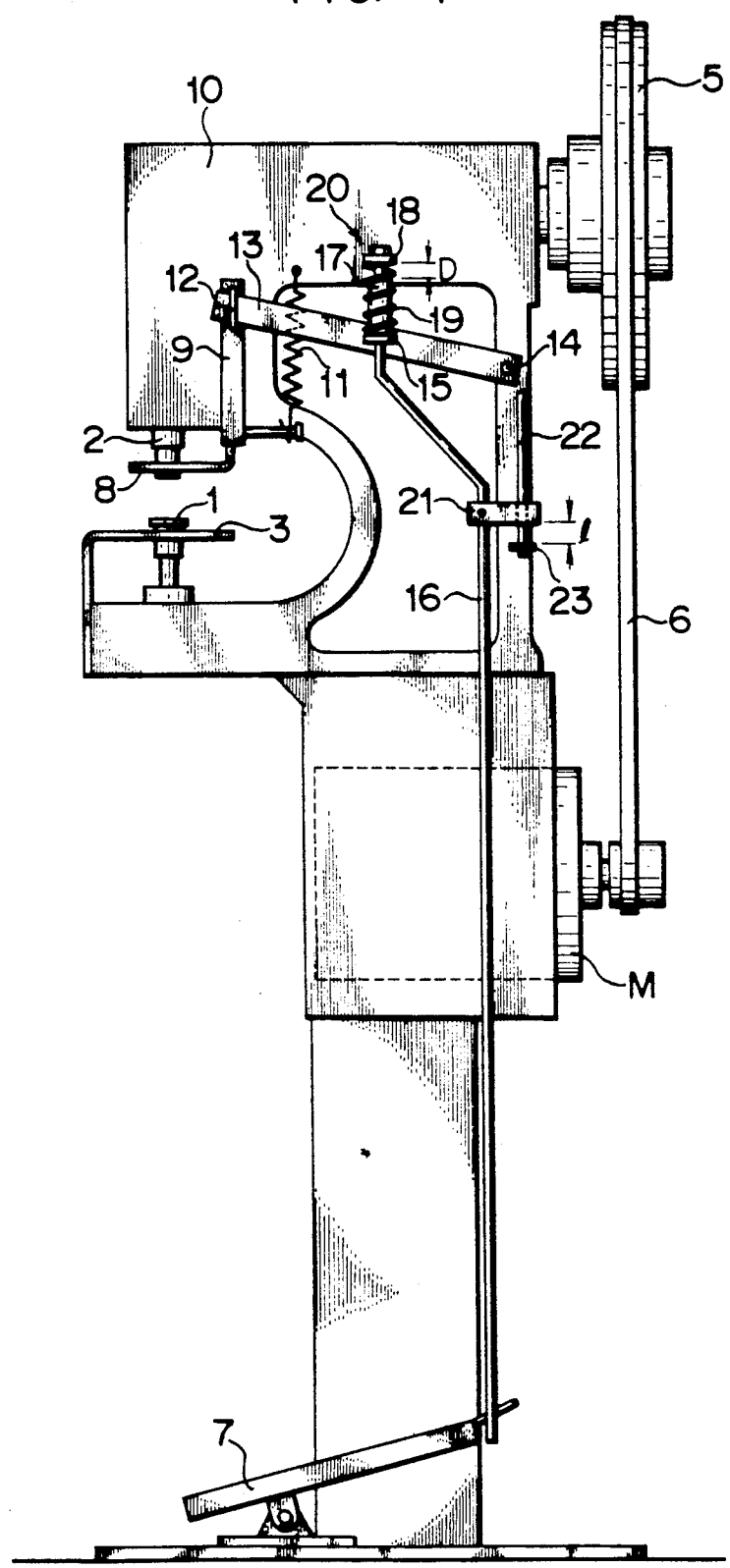
FIG. 1 is a side view of the button applicator relating to the present invention.
Figure 2:
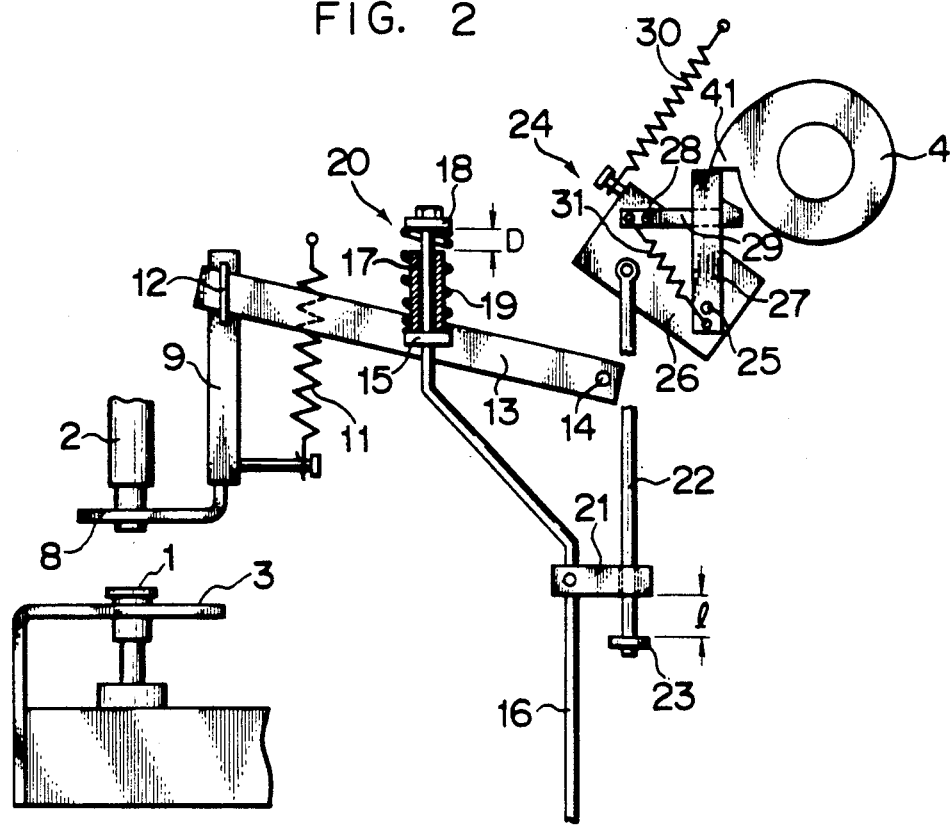
FIG. 2 is a schematic side view showing the important portion of the button applicator in FIG. 1.

Referring to FIGS. 1 and 2, one button element is placed on a die 1. A punch 2 moves upward and downward. The button applicator of the present invention is a manual button applicator for caulking one button element to another button element through a fabric piece by bringing down the punch 2 to the die 1. One button element is gripped by the punch 1 and another button element is placed on the die 1 by hands. The die 1 is mounted on a table 3.

The punch 2 is linked to the shaft of the one-rotation clutch 4 and is moved upward and downward when the clutch 4 is released. The clutch 4 is placed coaxially beside a flywheel 5, which is rotated freely by a motor M through a driving belt 6. When a foot pedal 7 is stepped upon and translated downwardly the clutch 4 is released and is brought into contact with the free rotating flywheel 5. After the clutch 4 turns one-rotation, it stops and is brought out of contact with the flywheel 5. As shown in above mentioned Japanese Laid-Open Utility Model Publication No. 56-143218, the structure of the clutch 4 is known. Hence, a detailed explanation of its structure is omitted.

After a plate type safety member 8 is brought down to the die 1, the punch 2 is arranged to be brought down. The safety member 8 is fixed to a fixture 9 which is slidably upward and downward provided on a supporting frame 10 of this button applicator and is always urged upward by a suspension coil spring 11.

A hook 12 being apertured upward is provided on the fixture 9 for the safety member 8 at its upper end. One end of a swing lever 13 is pivotably supported by the supporting frame 10 by a pin 14 and a punch-side end of the swing lever 13 is hooked by the hook 12. A sliding bearing 15 is fixed to the substantial center of the swing lever 13. A bar type operation rod 16 connected to the foot pedal 7 is inserted slidably upward and downward into the sliding bearing 15. A collar 17 is mounted on the upside of the sliding bearing 15. The operation rod 16 extends slidably through the collar 17, and its upper end is exposed to be a rod end 18. Between the rod end 18 and the collar 17, there is a predetermined interval D, by which a time lag is produced between the time when the foot pedal 7 is stepped and the time when the clutch 4 is allowed to release and rotate. The predetermined interval D is supported by a compression coil spring 19 provided between the sliding bearing 15 and the rod end 18. The force of the compression coil spring 19 is greater than that of the suspension coil spring 11 urging upward the safety member 8. A means 20 for shutting off the clutch 4 comprises the sliding bearing 15, the collar 17, rod end 18, the compression coil spring 19 and the predetermined interval D. The means 20 for shutting off the clutch 4 produces a time lag from a time, when the safety member 8 is brought down to a last position, to a time, when the clutch 4 is released to bring down the punch 2. Accordingly, after the safety member 8 is brought down to a predetermined point, the foot pedal 7 is required to be further stepped in order to rotate the clutch 4 and bring down the punch 2.

A punch-side end of an interconnecting member 21 is in place fixed vertically to the operation rod 16. An intermediate rod 22 is inserted into another end of the interconnecting member 21 to move slidably upward and downward. A stopper 23, whose diameter is larger than that of the intermediate rod 22, is attached integrally to the intermediate rod 22 at its lower end. The stopper 23 is normally spaced a predetermined distance 1 apart from the interconnecting member 21. When the foot pedal 7 is stepped, the interconnecting member 21 is brought down together with the operation rod 16. Then, the swing lever 13 is pivoted to bring down the safety member 8. The interconnecting member 21 is arranged to be brought down until it stops against the stopper 23 of the intermediate rod 22, when the safety member 8 is brought down to the table 3. A means for allowing the rotation of the clutch 4 comprises the interconnecting member 21 fixed to the operation rod 16, the intermediate rod 22 and the stopper 23. As shown in FIG. 2, a connecting and disconnecting mechanism 24 is linked to the upper end of the intermediate rod 22. A swing plate 26, which is pivoted to the supporting frame 10 about a pin 25 of a connecting and disconnecting lever 27, is pivoted to the upper end of the intermediate rod 22. The connecting and disconnecting lever 27, which is pivoted about the pin 25 to the swing plate 26, connects to and disconnects from a claw 41 of the one-rotation clutch 4. An engaging lever 29, which is pivoted by the swing plate 26 about a pin 28 of the engaging lever 29 projecting from the swing plate 26 at the opposite point of a diagonal line in relation to the pin 25, is engaged with the connecting and disconnecting lever 27. A suspension coil spring 30 urges the swing plate 26 in a clockwise direction on FIG. 2. A suspension coil spring 31 of a swing plate 26, which is connected between the pin-side end of the connecting and disconnecting lever 27 and the pin-side end of the engaging lever 29, urges the two levers 27 and 29 to be pivoted in opposite directions each other, thus they are engaged with each other.

The button applicator relating to the present invention has the above mentioned composition. Now, with reference to the schematic operational diagrams in FIGS. 2, 3, 4, and 5, operation of this invention is explained.

In FIG. 2, the button applicator is not operated. In this case, the claw 41 of the clutch 4 engages the upper end of the connecting and disconnecting lever 27. Accordingly, the one-rotation clutch 4 is not released while only the flywheel 5 rotates freely by the motor M.

Figure 3:
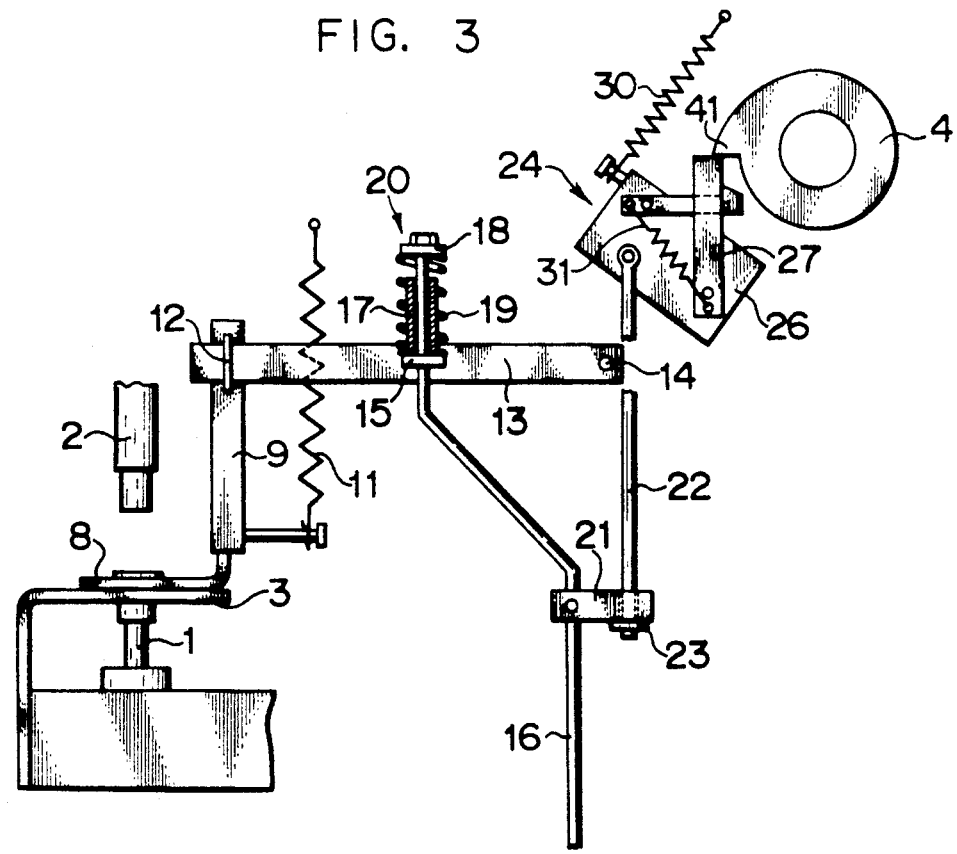
FIGS. 3, 4 and 5 are operational diagrams of the button applicator in FIG. 2.

Then, as shown in FIG. 3, when the foot pedal 7 is stepped, the operation rod 16 is brought down. As the force of the compression coil spring 19 of the means 20 shutting off the clutch 4 is greater than that of the suspension coil spring 11, the compression coil spring 19 is not compressed. Accordingly, the swing lever 13 swings and the safety member 8 is brought down to the table 3 against the force of the suspension coil spring 11. At the same time, the interconnecting member 21, into which the operation rod 16 is inserted, brought down until it stops against the stopper 23 of the intermediate rod 22 in accordance with downward movement of the operation rod 16. In this situation, the interconnecting member 21 does not yet bring down the intermediate rod 22. Therefore, the connecting and disconnecting mechanism 24 is not actuated, thus the one-rotation clutch 4 is not rotated. As a result, the punch 2 is not brought down.

Figure 4:
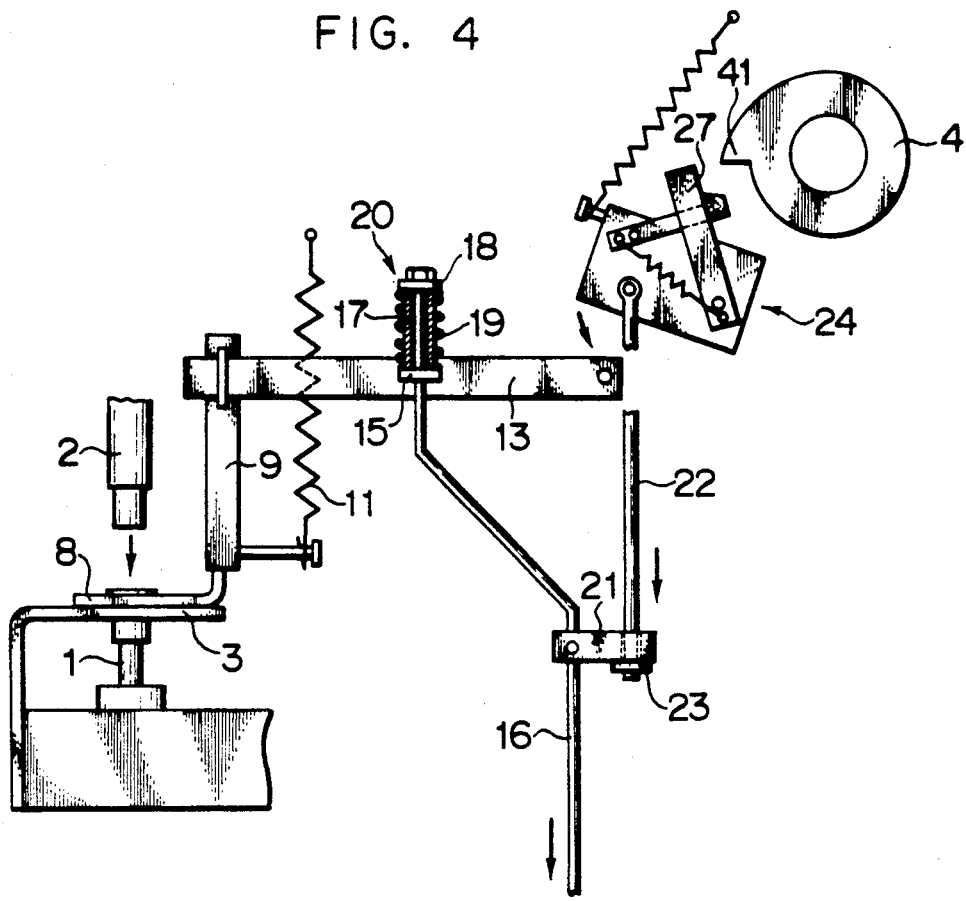

As shown in FIG. 4, as the foot pedal 7 is further stepped to a point lower than its point in FIG. 3, the operation rod 16 is further brought down against the compression coil spring 19 with a depth same to the predetermined interval D which is a gap from the upper end of the collar 17 to the rod end 18. Hence the intermediate rod 22 is brought down by the interconnecting member 21 to facilitate the swing plate 26 of the connecting and disconnecting mechanism 24 to rotate about the pin 25 counterclockwise against the force of the suspension coil spring 30, thus the claw 41 of the one-rotation clutch 4 disengages from the upper end of the connecting and disconnecting lever 27. As a result, the one-rotation clutch 4 is released to rotate for bringing down the punch 2.

Figure 5:
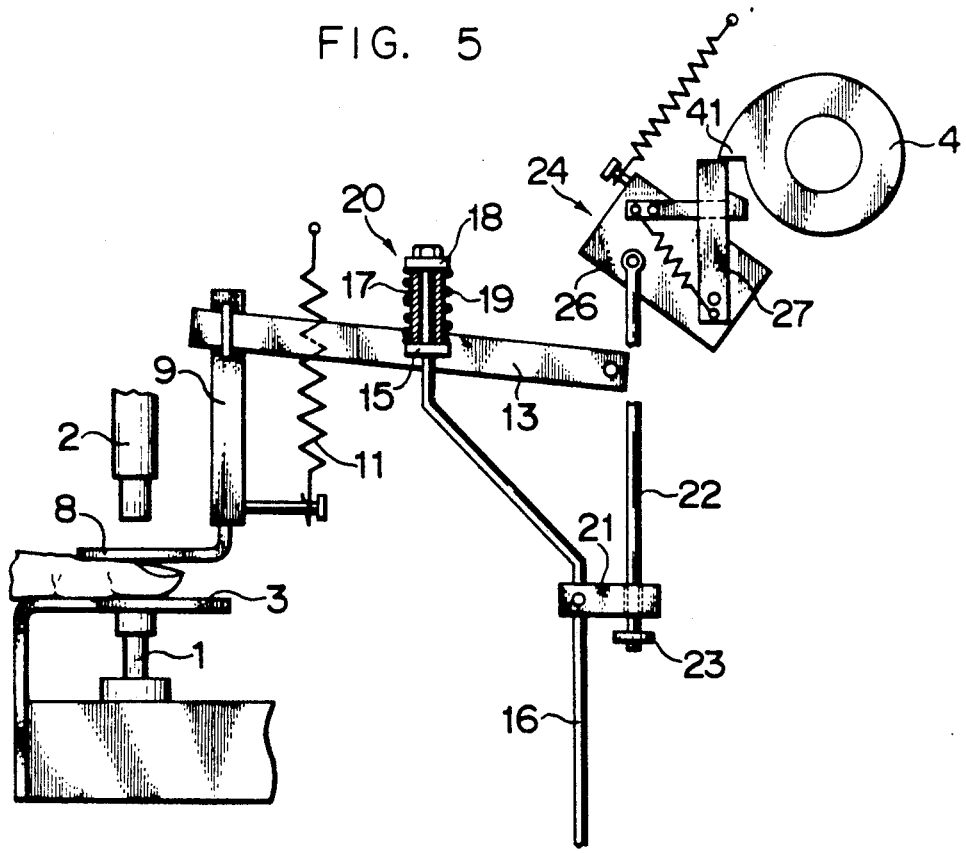

However, as shown in FIG. 5, in case that fingers of an operator happen to stay between the table 3 and the safety member 8, even if the pedal 7 is stepped to a last point, the safety member 8 is prevented from bringing down due to the thickness of the fingers, thus the operation rod 16 can not be brought down to the position in FIG. 4. Accordingly, the interconnecting member 21 does not contact with the stopper 23 of the intermediate rod 22. Hence, the intermediate rod 22 is not brought down. Therefore, the swing plate 26 does not rotate to maintain engaging of the claw 41 of the clutch 4 with the connecting and disconnecting lever 27. Finally, the punch 2 is not brought down as the clutch 4 is not released.

While preferred embodiments have been described, it is apparent that the present invention is not limited to the specific embodiments thereof.

What is claimed is:

1. A button applicator having a one-rotation clutch which is actuated in conjunction with a foot pedal and which rotates by a connecting and disconnecting mechanism for caulking one button element gripped by a punch to another button element held on a die through a fabric piece by bringing down said punch when said clutch rotates, comprising
    a swing lever which is linked to an operation rod connected to said foot pedal and which swings about one end of said swing lever,
    a safety member which is provided between said punch and said die, which is linked to another end portion of said swing lever and which is urged upward, depression of said foot pedal causing said operation rod to move downward to a second position which swings said swing lever and moves said safety member downward to a predetermined position,
    a means for allowing rotation of said clutch which is provided between said operation rod and said connecting and disconnecting mechanism and which is designed to release said one-rotation clutch from said connecting and disconnecting mechanism for the rotation of said one-rotation clutch when said foot pedal is further depressed causing said operation rod to be brought down from said second position by a predetermined interval, to a deeper third position, and
    a means for shutting off said clutch which is provided between said operation rod and said swing lever and which urges upward said operation rod with a second predetermined interval.

2. A button applicator of claim 1, wherein an upward urging force for said safety member is smaller than an upward urging force for said operation rod.

3. A button applicator of claim 1, wherein said means for allowing the rotation of said clutch comprises
    an intermediate rod whose upper end is linked to said connecting and disconnecting mechanism and which is provided with a stopper at its lower end and
    an interconnecting member whose one end is fixed to said operation rod, into whose another end said intermediate rod is inserted to move slidably upward and downward, which is brought down until it stops against said stopper when said safety member linked to said swing lever is brought down to said predetermined position.

4. A button applicator of claim 1, wherein said means for shutting off said clutch comprises
    a sliding bearing which is fixed to said swing lever and into which said operation rod is inserted,
    a collar which is mounted on said sliding bearing and from which a rod end of said operation rod is projected upward,
    a spring which is provided between said sliding bearing and said rod end, which makes said second predetermined interval on said operation rod between said rod end and said collar so that said operation rod can normally move with said swing lever integrally and which urges said rod end upward.

5. A button applicator according to claim 1, wherein said first predetermined interval and said second predetermined interval are equal.

6. A button applicator having a one-rotation clutch which is actuated in conjunction with a foot pedal and said clutch thereupon selectively rotates by selective actuation of a connecting and disconnecting mechanism, for caulking one button element gripped by a punch to another button element held on a die, through a fabric piece, said punch brought down to said die when said clutch rotates, comprising:
    a frame;
    a swing lever pivotally mounted at one end to said frame;
    an operation rod linked at a high end to said swing lever between said first end and a second end of said swing lever;
    a foot pedal linked to said operation rod at a low end of said operation rod;
    a safety member movable through a region between said punch and said die, and connected to said second end of said swing lever;
    a means for biasing said safety member upwardly with respect to said frame and said operation rod upwardly into a first position with respect to said frame, depression of said foot pedal to a first depth causing said operation rod to move downwardly to a second position, causing said swing lever to pivot about said first end downwardly at said second end, causing said safety member to translate downwardly to a predetermined position against the urging of said means for biasing;
    a means for actuating said connecting and disconnecting mechanism to allow rotation of said clutch, said means designed to activate said clutch for rotation when said foot pedal is further depressed from said first depth to a second depth causing said operation rod to be brought down from said second position by a first predetermined interval, to a deeper third position; and
    a means for overriding said means for actuating, said means for overriding provided between said operation rod and said swing lever and which urges upward said operation rod from said swing lever with a second predetermined interval, said means for overriding activated when an interference prevents said safety member from passing downwardly to said predetermined position by a descrete distance, and that discrete distance is greater than the second predetermined interval minus the first predetermined interval.

7. A button applicator according to claim 6, wherein said upward urging of said means for biasing is a smaller force than an upward urging force of said operation rod.

8. A button applicator according to claim 7, wherein said means for activating said connecting and disconnecting mechanism comprises:
    an intermedicate rod whose upper end is linked to said connecting and disconnecting mechanism and which is provided with a stopper at its lower end; and
    an interconnecting member whose first end is fixed to said operation rod, and into whose second end said intermediate rod is inserted to move slidably upward and downward, said interconnecting member is brought down to abut against said stopper when said safety member, linked to said swing lever, is brought down to said predetermined position.

9. A button applicator according to claim 8, wherein said means for overriding comprises:

a sliding bearing which is fixed to said swing lever and into which said operation rod is inserted;

a collar mounted on said sliding bearing;

a rod end portion connected to a top end of said operation rod;

said operation rod inserted through said collar with said rod end portion arranged above said collar;

a spring arranged between said sliding bearing and said rod end portion, biasing said rod end portion away from said sliding bearing, said spring causing said rod end portion to be distanced from said collar by said second predetermined interval, said second predetermined interval existing during operation until said safety member reaches its predetermined position or abuts an interference, whereupon further depressing of said foot pedal commences to compress said spring and decrease said clearance between said rod end portion and said collar.

10. A button applicator according to claim 6, wherein said means for overriding comprises a lost motion linkage between said operation rod and said swing lever, said lost motion linkage allowing said operation rod to move downwardly to said second position, moving said swing lever downwardly until said safety member reaches said predetermined position or said safety member abuts an interference located above said predetermined position, said operation rod thereafter movable independent of said swing lever downwardly by said second predetermined interval created by said lost-motion linkage.

11. A button applicator according to claim 10, wherein said lost motion linkage comprises a spring which urges upward said operation rod with said second predetermined interval from said swing lever, and said means for biasing comprises a second spring, stretched between said safety member and said frame, said first spring having a higher spring constant than said second spring.

* * * * *